Figure 1:
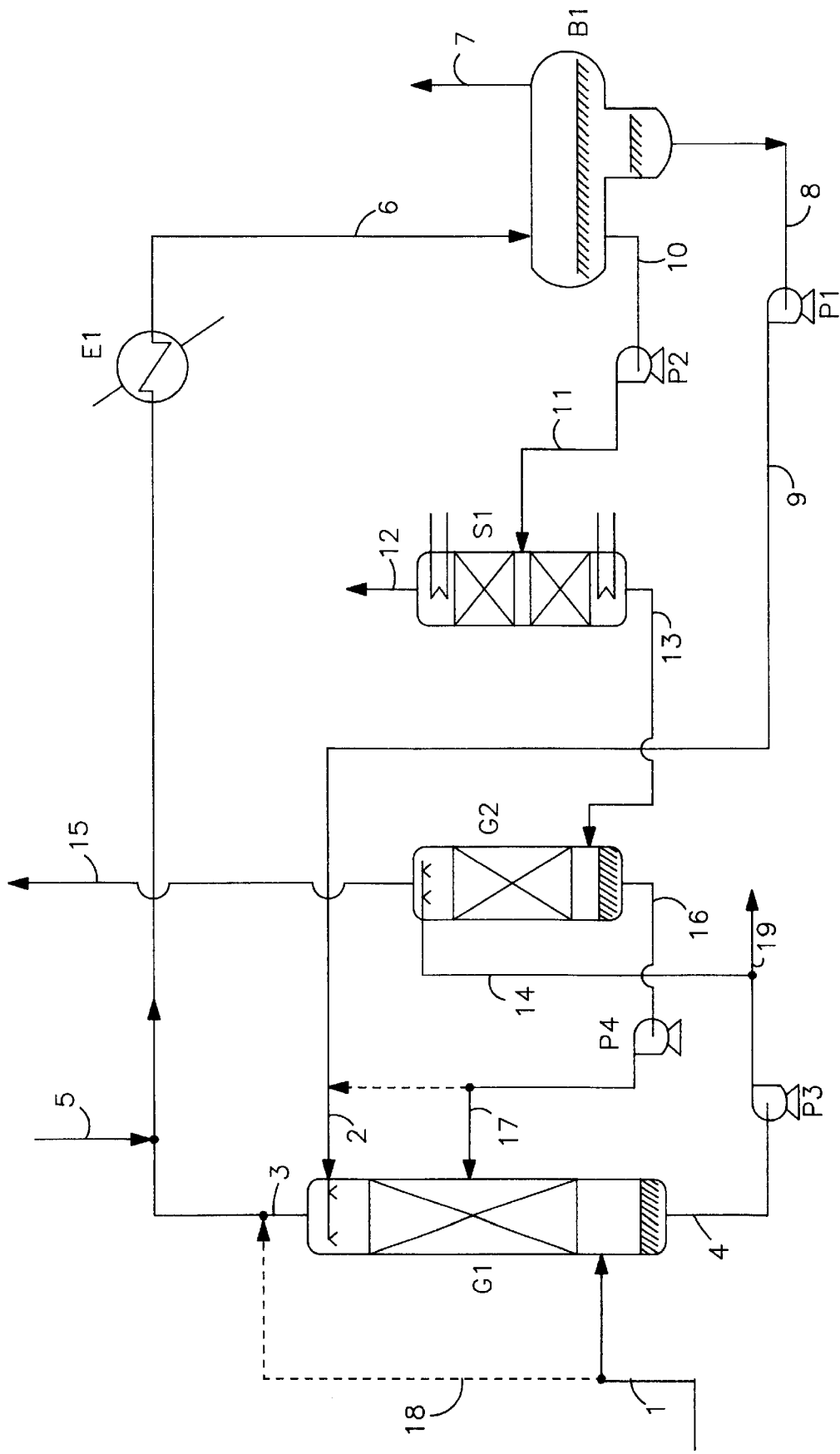

United States Patent
Rojey et al.

[11] Patent Number: 5,868,004
[45] Date of Patent: Feb. 9, 1999

[54] PROCESS FOR DEHYDRATING AND DEGASSING A GAS, COMPRISING A PRELIMINARY COOLING STEP

[75] Inventors: Alexandre Rojey, Rucil Malmaison; Nicole Doerler, Nanterre; Joseph Larue; Etienne Lebas, both of Rueil Malmaison, all of France

[73] Assignee: Institut Francais du Petrole, France

[21] Appl. No.: 935,895

[22] Filed: Sep. 23, 1997

[30] Foreign Application Priority Data

Sep. 24, 1996 [FR] France .................................. 96 11693

[51] Int. Cl.⁶ ..................................................... F25J 1/00
[52] U.S. Cl. ................................................. 62/625; 62/633
[58] Field of Search ........................................ 62/633, 625

[56] References Cited

U.S. PATENT DOCUMENTS

| | | | |
|---|---|---|---|
| 2,672,034 | 3/1954 | Morrow | 62/633 |
| 2,994,644 | 8/1961 | Clay | 62/633 |
| 3,925,047 | 12/1975 | Harper | 62/633 |
| 4,266,958 | 5/1981 | Cummings | 62/633 |

FOREIGN PATENT DOCUMENTS

| | | |
|---|---|---|
| 2 605 241 | 4/1988 | France . |
| 2 636 857 | 3/1990 | France . |

*Primary Examiner*—Ronald Capossela
*Attorney, Agent, or Firm*—Millen, White, Zelano, & Branigan, P.C.

[57] ABSTRACT

A process for treating a gas containing methane, at least one higher hydrocarbon and water to eliminate the water and/or extract the higher hydrocarbon(s) comprises dividing the gas to be treated into at least two fractions each of which undergo at least one cooling step, and bringing an aqueous phase fraction obtained after cooling into contact with the gas to be treated. The treatment process uses units with reduced floor space and weight.

17 Claims, 4 Drawing Sheets

FIG. I

PROCESS FOR DEHYDRATING AND DEGASSING A GAS, COMPRISING A PRELIMINARY COOLING STEP

The invention concerns a process for treating a gas containing methane, at least one higher hydrocarbon and water, to eliminate the water and/or extract the higher hydrocarbon(s) therefrom.

The process of the invention can advantageously be used to carry out natural gas treatment operations, namely dehydration and separation of at least part of the condensable hydrocarbons included in the natural gas, using an integrated and optimised process.

Petroleum products, in particular natural gas, and other gases containing hydrocarbons such as refinery gas, contain substances which are undesirable as regards transport and/or handling.

One of the principal constituents to be eliminated from such substances is water, which has been shown to be a hydrate promoter and encourages corrosion, in particular when the petroleum product contains acidic compounds such as $H_2S$ and/or $CO_2$. Hydrates can cause blockages in the transport lines and the corrosive action of the acidic gases contained in a natural gas causes deterioration of the downstream lines and units for treating and distributing natural gas.

These two phenomena have extremely bad consequences which can lead to a stoppage in hydrocarbon production.

Gas treatment can also include a step for extracting higher hydrocarbons, for example a liquid natural gas fraction (LNG) defined as comprising an LPG fraction and a gasoline fraction ($C_5^+$). Such a step either adjusts the hydrocarbon dew point to avoid condensation of a hydrocarbon fraction during gas transport, or recovers an LNG fraction, which has a higher market value than the treated gas.

The prior art describes different processes for treating natural gas.

French patent FR-B-2 605 241 describes a treatment process using a cooled physical solvent to carry out all of the natural gas treatment operations: dehydration, alone or combined with extraction of higher hydrocarbons, and/or deacidification of that gas, if it contains acidic compounds.

FR-B-2 636 857 shows that when the process comprises a step for separating the higher hydrocarbons (LNG), solvent recovery can be improved by using a step for washing the liquid hydrocarbons with water from the gas dehydration step.

The applications of such a process have been discussed, for example, in the publication "IFPEXOL for Environmentally Sound Gas Processing" by J. Larue, A. Minkninen and S. Patel, presented at the $71^{st}$ "GPA" convention in March 1992 at Anaheim, Calif., USA.

The publication "Integrated Natural Gas Treatment: Gained Industrial Experience with IFPEXOL Process" by S. Patel, A. Minkkinen, J. Larue and J. F. Levier, presented at "IGCR 95", Cannes, France in November 1995, describes washing the liquid hydrocarbon phase with water to recover at least part of the solvent it contains.

FIG. 1 shows a prior art process when the gas to be treated contains methane, water, at least one condensable hydrocarbon, and possibly acidic compounds. The process can be described as follows.

Natural gas to be treated arrives via a line 1. All or a fraction of the gas is brought into contact with a mixture of solvent and water from line 2, in a contact zone G1 formed by a packing, for example.

The solvent used can be selected from methanol, ethanol, propanol, methylpropylether, ethylpropylether, dipropylether, methyltertiobutylether, dimethoxymethane, dimethoxyethane and methoxyethanol. Methanol is the preferred solvent.

A gas phase charged with solvent is evacuated overhead via a line 3. An aqueous phase which is substantially free of solvent is extracted from the bottom via a line 4.

It should be noted that the treatment process can be optimised by adjusting the gas fraction passing through contact zone G1 and the gas fraction which circulates outside this contact zone as a function of the composition of the gas to be treated and the performances required. This option, shown in FIG. 1 as a dotted line, allows a portion of the gas to be treated, circulating via a line 18, to be directly mixed with the gas leaving the contact zone via line 3. The fraction of gas which does not enter the contact zone can, for example, comprise between 0 and 50% of the quantity of gas to be treated.

The overhead gas phase, containing water and solvent, is usually close to saturation. It is cooled by a coolant in an exchanger E1 to condense an aqueous phase containing solvent and a liquid hydrocarbon phase. It has been shown that the solvent entrained in the gas phase at the outlet from contact zone G1 may be sufficient to avoid the problems of hydrate formation connected with the cooling step E1. A makeup can be added to the process via a line 5 to compensate for loss of solvent in the treated gas, in the liquid hydrocarbon fraction (LNG) and possibly in the water discharged via a line 19. A purge stream can be established via line 19 to keep constant the quantities of solvent and water present in the total circuit.

The mixture of gas and liquid phases obtained leaves exchanger E1 via a line 6. The two liquid phases and the gas phase are separated in a drum B1.

The treated dehydrated gas is evacuated from this drum via a line 7. The two liquid phases from the condensation step are separated by setting in the lower portion of B1.

The aqueous phase, formed essentially of water and solvent, leaves drum B1 via a line 8. A pump P1 reinjects the aqueous phase via a line 9 into line 2 and then into contact zone G1.

The hydrocarbon phase, formed essentially of condensable hydrocarbons of natural gas ($C_3^+$) (possibly containing dissolved ethane and methane) and solvent, can be evacuated to a stabilisation and washing circuit via a line 10. At this stage of the process, heat exchange between the gas from contact zone G1 and the hydrocarbon phase evacuated from line 10 is possible. It is not shown in FIG. 1. A pump P2 sends the liquid hydrocarbon phase to a stabilisation column S1 via a line 11. The aim of this operation is to separate the most volatile components ($C_1$ and $C_2$) from the liquid hydrocarbon phase and evacuate them from the process via a line 12. The hydrocarbon phase containing constituents with a molar mass of over $C_2$ is sent via a line 13 to a water washing zone G2 to eliminate the solvent it contains.

The aqueous phase, evacuated from contact zone G1 via line 4 and at least partially free of solvent, is taken up by a pump P3. A fraction of this aqueous phase is sent to contact zone G2 via a line 14, at a controlled flow rate. The other fraction is evacuated via line 19.

In contact zone G2, the fraction of the aqueous phase arriving via line 14 washes the hydrocarbon phase. The solvent has a higher affinity for water than for the hydrocarbon phase and is at least partially recovered in the aqueous phase at the outlet from this step.

The liquid hydrocarbon phase, free of the major portion of the solvent it contained on entering contact zone G2, is evacuated via line 15.

The aqueous phase containing the solvent is evacuated from contact zone G2 via a line 16. This phase is taken up by a pump P4 and injected into contact zone G1. Depending on the concentration of the solvent, this phase is injected into contact zone G1 via a line 17 or it is injected into line 2 to be mixed with the aqueous phase arriving from drum B1 via line 9.

This process has important advantages over previous techniques. It means a significant gain as regards investment and the floor space and weight of facilities, which can be of particular advantage when considering offshore hydrocarbon production. Further, separating water and solvent by contact with the gas to be treated can avoid the need for separation by distillation.

However, it is also possible to make additional gains as regards investment, floor space and weight and as regards the operating costs of gas treatment by using the process of the invention.

The process and unit of the invention are advantageously used to dehydrate a gas such as natural gas containing water and at least one higher hydrocarbon, and to produce at least partial separation of the condensable hydrocarbons.

The principal of the process of the invention is that the gas to be treated is divided into at least two fractions (1) and (2):

fraction (1) is cooled in the absence of a solvent to a temperature which is close to but higher than the hydrate formation temperature, to evacuate a large portion of the condensable fractions; and fraction (2) is brought into contact with an aqueous phase comprising a solvent from a second cooling step carried out in the presence of a solvent.

This contact step produces an aqueous phase which is at least partially free of solvent and a gas phase which contains solvent, meaning that the gas can be cooled to a lower temperature than the temperature reached during the first cooling step for fraction (1), reaching thereby the specifications required for the gas.

The process of the invention is characterized in that it comprises the following steps:

a) dividing the gas to be treated into two fractions (1) and (2);

b) cooling said fraction (1), inducing condensation of an aqueous liquid phase and a higher hydrocarbon liquid phase;

c) separating the phases from cooling step (b);

d) bringing said fraction (2) of gas to be treated from separation step (a) into contact with an aqueous phase comprising a solvent, in a contact zone, the solvent contained in the aqueous phase being extracted by the gas which, at the end of said step (d), is charged with solvent, and the aqueous phase which is at least partially free of solvent being evacuated at the bottom of the contact zone;

e) providing a solvent makeup system;

f) cooling the gas fractions from steps (c) and (d) in the presence of a solvent, either separately or mixed at least in part, to partially condense an aqueous phase comprising solvent and a liquid hydrocarbon phase;

g) separating the treated gas, at least partially free of the water and of the higher hydrocarbons it contained, the aqueous phases and the liquid hydrocarbon phase from cooling step (f);

h) recycling at least part of the aqueous phase comprising solvent from the end of step (g) to contact step (d).

The process of the invention will be described in more detail below, with reference to the implementation shown in FIG. 2.

The gas to be treated is divided into two fractions circulating via lines 51 and 52.

A first gas fraction, passing via line 52, is cooled by a heat exchanger E51. At the outlet from this exchanger, the temperature of the gas is close to but higher than the hydrate formation temperature in the gas to be treated. The cooling fluid used in this exchanger can be a cooling fluid which is available to the unit, for example air or water, or all or part of the treated gas from a cold drum B1 passing via a line 7 and through exchanger E52. The partially condensed fluid obtained is sent to a three-phase separating drum B51. Water and the liquid hydrocarbon phase condensed during the cooling step E51 are separated by settling in drum B51. It should be noted that these two fluids are free of solvent. The liquid hydrocarbon fraction is evacuated from the process via a line 57, either for upgrading, or for re-injection upstream of exchanger E52, shown by the dotted line. The aqueous phase obtained, which does not contain solvent, is evacuated from the process via a line 58. It can advantageously be used in a subsequent washing step for the liquid hydrocarbon phase polluted by solvent, as will be described for the implementation illustrated in FIG. 4.

A second fraction of gas, circulating via line 51, is sent to the bottom of a contact zone G50, in which it can extract at least part of the solvent contained in the aqueous phase sent to the head of contact zone G50 via line 53. The aqueous phase, free of at least part of the solvent which it contained, is evacuated from the bottom of contact zone G50 via a line 55, and the gas which is charged with solvent is evacuated from the head of contact zone G50 via a line 54.

Gas from three-phase drum B51 via line 59 is mixed with gas charged with solvent arriving from the contact zone via line 54. Line 61 provides a solvent makeup to the process. The quantity of this makeup is controlled so as to obtain a concentration in the gas such that any risk of hydrate formation is avoided during the subsequent cooling steps, and compensates for the loss of solvent in the treated gas and in the liquid fractions.

The gas mixture charged with solvent which is obtained is sent via a line 60 to heat exchanger E52, in which it is cooled by heat exchange with the treated gas. Cooling is thus continued in exchanger E1 using a coolant, to condense the fractions of water and hydrocarbons required by the process specifications.

The liquid and gas phases leaving exchanger E1 via line 63 are separated by settling in drum B1

The dehydrated treated gas is evacuated via line 7. The liquid hydrocarbon phase is evacuated from the process via a line 64. It can undergo stabilisation and/or washing steps, as described for the implementation illustrated in FIG. 4. The aqueous liquid phase containing solvent is evacuated from drum B1 via line 8, then recycled to the head of contact zone G50 using pump P1 and line 53.

The process of the invention has the particular advantage of being able to be carried out with a column for contacting the aqueous phase comprising solvent and the gas fraction which is supplied to extract the solvent, which is of greatly reduced dimensions, using a reduced fraction of gas to be treated, generally below 50%, and possibly less than 30%, for example.

The solvent used in the process of the invention must be at least partially miscible with water to have an inhibiting effect on the formation of ice and/or hydrates. In order to be extracted readily from an aqueous solution by contact with the gas to be treated, it must have a boiling point which is not high, preferably less than the boiling point of water, or it must form an azeotrope with water with a low boiling point.

This solvent can be an alcohol, for example, such as methanol, ethanol, or propanol, or an ether such as methylpropylether, dipropylether, or methyltertiobutylether, or a ketone, or dimethoxymethane, dimethoxyethane or methoxyethanol. This list is given by way of non limiting illustration.

In the process of the invention, the temperature at the outlet from step (f) is generally between $-5°$ C. and $-100°$ C. The lower the temperature, the higher must be the concentration of the solvent in the aqueous phase from step (g) which is recycled to step (d). This concentration is generally in the range 40% to 90% by weight.

The gas fraction (2) passing through the contact zone during step (d) preferably represents 10% to 50% of the total gas to be treated.

During step (g), the gas can be cooled either using an external cooling cycle or by depressurizing through a valve or a turbine.

The temperature at the end of cooling step (b) is preferably in the range $-5°$ C. to $+30°$ C. This cooling step can be carried out, for example, either by heat exchange with the treated gas or by heat exchange with an external cooling fluid, for example water or air or if necessary by heat exchange with a coolant circulating in an external circuit.

Figure 3:
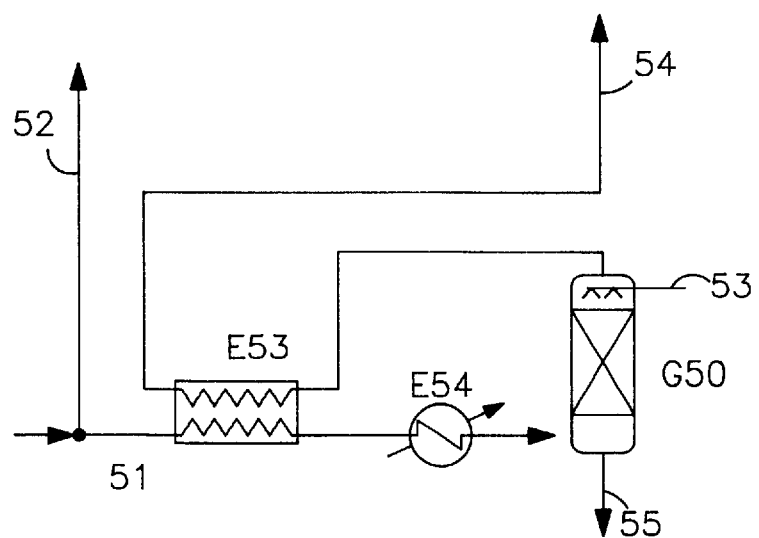

Gas fraction (2) which is sent to the contact zone during step (d) can be pre-heated, to extract the solvent more easily from the aqueous phase sent to the head of the contact zone during step (d). The scheme of FIG. 3 can be used, for example.

The fraction of the feed which is sent to contact zone G50 via line 51 is pre-heated in a heat exchanger E53 using gas leaving contact zone G50, then in a heat exchanger E545 using an external fluid which can, for example, be a hot gas or steam.

The temperature at the end of this heating step can, for example, be in the range 80° C. to 150° C. Such a disposition is particularly advantageous when the solvent used is heavier than methanol, for example ethanol.

Figure 4:
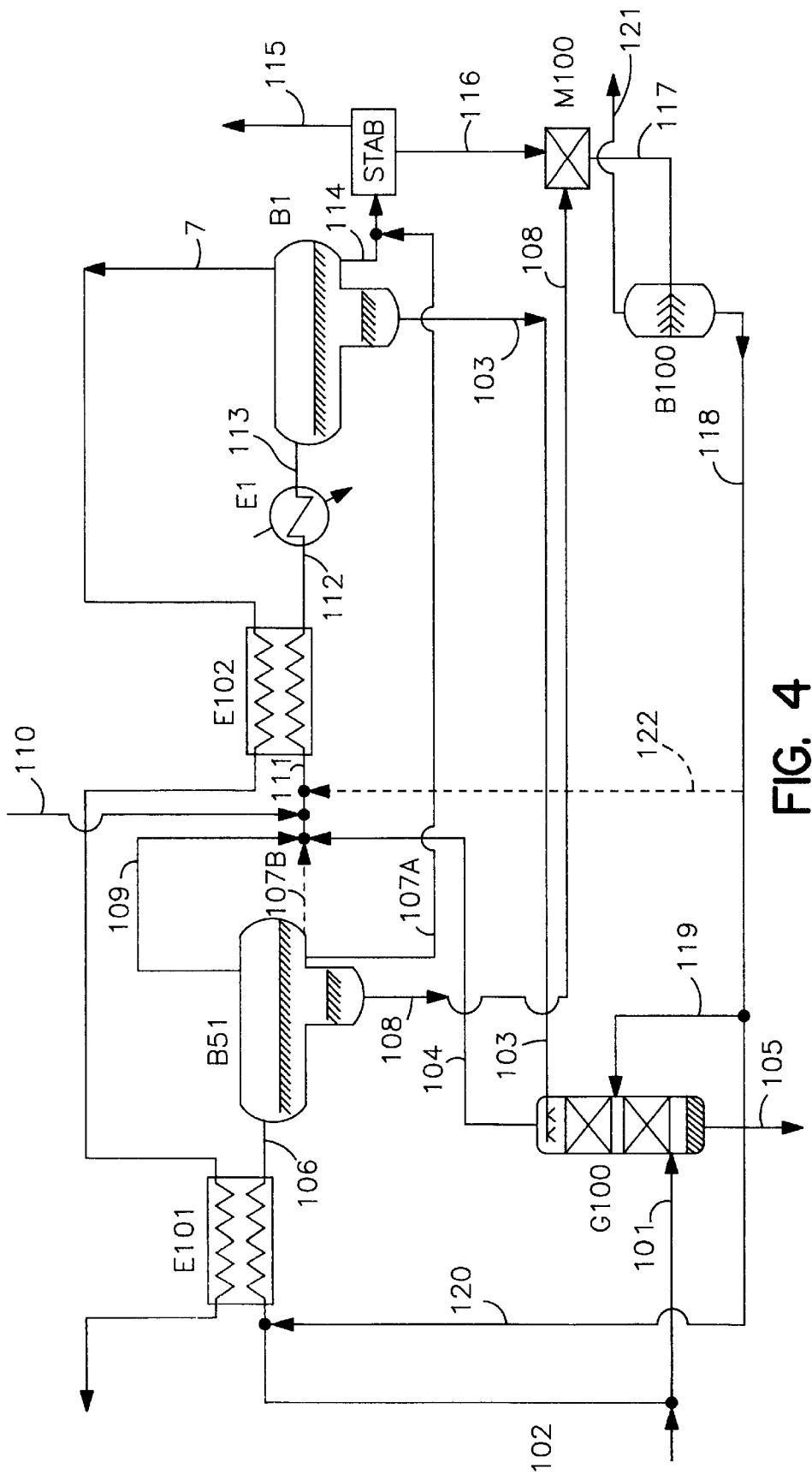

The aqueous phase which is recovered at the end of step (c) can advantageously be used to wash the liquid hydrocarbon phase containing methanol recovered at the end of step (g) of the process. FIG. 4 shows an implementation of this case.

The gas to be treated is divided into two fractions (1) and (2). Fraction (2) circulating via a line 101 is injected into the bottom of a contact zone G100. An aqueous solution containing solvent is recycled via a line 103 to the head of this contact zone, while a fraction of the aqueous solution charged with solvent from washing the condensates is sent to the column as a side stream via a line 119. This fraction of aqueous solution is adjusted to that the flow rate of an aqueous solution which is highly depleted in solvent evacuated from the lower portion of the contact zone via a line 105 approximately corresponds to the quantity of water which must be eliminated from the gas to be treated.

The fraction (1) of gas circulating via a line 102 is mixed with the complement of the aqueous solution which is charged with solvent from washing the condensates, via a line 118 and a line 120. The mixture is sent to a heat exchanger E101, where is it heated to a temperature close to but higher that the hydrate formation temperature.

The partially condensed mixture leaving the exchanger via a line 106 is sent to a three-phase separation drum B51.

The aqueous phase and the liquid hydrocarbon phase condensed during cooling in E101 are separated by settling in drum B51. The aqueous phase which is slightly charged in solvent evacuated from drum B51 via a line 108 is sent to a static mixer M100 to wash the liquid hydrocarbon phase polluted with solvent. The gas evacuated from three-phase drum B51 via a line 109 is mixed with the gas charged with solvent leaving the contact zone via a line 104.

The liquid phase constituted by hydrocarbons from three-phase drum B51 is evacuated from the process via a line 107A and sent to the stabilisation step. It can also be re-injected into the process upstream of heat exchanger E102, as shown in the dotted lines, via a line 107B.

The mixture obtained in line 111 is sent to heat exchanger E102 in which it is cooled by exchange with the treated gas. It is then cooled by a coolant in exchanger E1, to condense an aqueous fraction and a liquid hydrocarbon fraction.

The liquid and gas phases leaving exchanger E1 via a line 113 are separated in a drum B1.

The treated gas is evacuated from this drum via line 7. As shown in FIG. 4, this gas can be used as a cooling fluid in exchangers E102 and E101 before being evacuated from the process. The two liquid phases from the condensation step carried out in exchanger E1 are separated by settling in drum B1. The condensed liquid hydrocarbon phase leaving drum B1 via a line 114 is stabilised. The aim of this operation is to separate the most volatile components ($C_1$ and $C_2$) from the hydrocarbon phase, and evacuate them from the process via a line 115. The liquid hydrocarbon phase containing the components which are higher than $C_2$ is sent to mixer M100 via a line 116, where it is brought via line 108 into contact with the aqueous phase which is slightly charged with solvent from the separating drum. The major portion of the solvent, which is preferentially soluble in water, passes from the hydrocarbon phase to the aqueous phase during this step. The mixture of the two phases is sent via line 117 to a two-phase separating drum B100 where after settling, a stabilised and washed liquid hydrocarbon phase which can be upgraded is evacuated via a line 121, and an aqueous phase charged with solvent is evacuated via a line 118. Part of this aqueous phase is sent upstream of exchanger E101 via line 120, and part is sent to an intermediate point in contact zone G100 via line 119. The relative flow rates in lines 119 and 120 are adjusted to as to maintain constant the quantities of water and solvent circulating in the process.

Other arrangements can be used without departing from the scope of the invention.

In particular, it is possible to send the aqueous phase from the washing step for the liquid hydrocarbon phase either entirely or in part upstream of the second cooling step, as shown in FIG. 4, by line 122, shown as a dotted line, which sends the aqueous phase from drum B100 upstream of exchanger E102.

The liquid hydrocarbon phase can be washed with the aqueous phase in a single mixer followed by a settler. A counter-current column can also be used, for example a packed column. Different types of packing can be used, for example a structured packing.

Contact between the fraction (2) of the gas to be treated and the aqueous phase during step (d) can also be carried out in different columns, for example a plate column or a packed column. When a packed column is used, a structured packing can be used.

Different types of heat exchanger can be used in the process, for example a shell and tube or a plate exchanger, containing soldered aluminium plates, for example.

Figure 2:
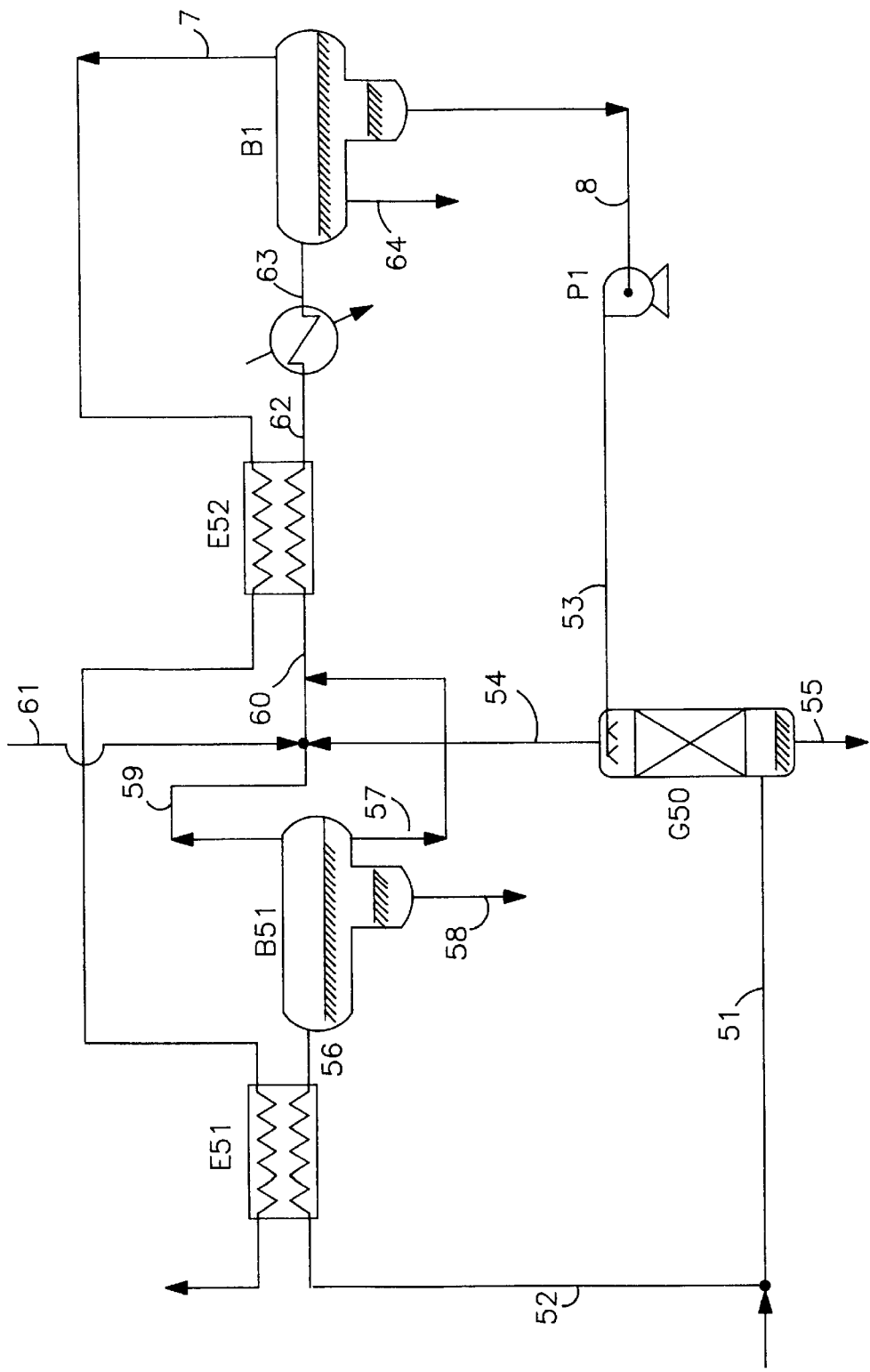

The advantages of the process of the invention, described with reference to FIG. 2, are shown in Example 1. Example 2 better defines the operating conditions of the process when the liquid hydrocarbon phase is washed. This example is described with reference to FIG. 4.

EXAMPLE 1

A natural gas was produced on site at a pressure of 5 MPa and at a temperature of 67° C.; its composition is given in Table 1. It was saturated with water (water content at the process inlet of about 6000 ppm mole). The flow rate was 380 tonnes/h, corresponding to an output of 10 MNm$^3$/day.

| Composition | % by weight |
|---|---|
| $N_2$ | 0.8 |
| $CO_2$ | 7.6 |
| Methane | 62.7 |
| Ethane | 10.5 |
| Propane | 5.6 |
| Butane | 3.3 |
| Pentane | 6.8 |
| $C_{6+}$ | 2.7 |

The solvent used in this example was methanol. 90% of the gas produced was sent via line 52 to exchanger E51. At the outlet from this exchanger, in line 56, the temperature of the partially condensed gas was 20° C.

Three phases left separating drum B51:
 a flow of 335.60 tonnes/h of gas with a residual water content of 560 ppm mole;
 a flow of 1.68 tonnes/h of water which was either evacuated from the process or used to wash the condensed hydrocarbon phase from drum B1 again. This flow represented approximately 80% of the water contained in the gas to be treated; and
 6.60 tonnes/h of condensed hydrocarbon phase (LNG) which was free of methanol, which could optionally be stabilised before being evacuated from the process for upgrading or re-injected into the process upstream of exchanger E52.

The remaining fraction of the gas produced (10%) was injected into contact zone G50 via line 51. Contactor G50 contained a structured packing. A recycled aqueous solution of methanol was injected to the head of the contactor via line 53, at a temperature of −35° C. At the outlet from the contact step, an aqueous solution which was depleted in solvent left the contactor via line 55. This solution contained 136 ppm by weight of solvent. The total flow of the aqueous phase evacuated via lines 58 and 55 (about 2 tonnes/h) approximately corresponded to the quantity of water initially contained in the 380 tonnes/h of gas to be treated.

The gas leaving the head of the packing via line 54 became charged with solvent on contact with the aqueous solution. It contained 1.20% by weight of solvent. This gas was mixed with gas from drum B51 and received a methanol makeup of 175 kg/h before being sent to exchangers E52 and E1. This makeup was adjusted to avoid any risk connected with hydrate formation. After exchanger E1, the temperature was −35° C. Drum B1 separated three phases:
 a flow of 315 tonnes/h of treated gas, containing a residual water content of 5.13 ppm mole. This gas could optionally be used as a coolant for exchangers E22 and E21 before being sent to a distributing system;
 a flow of 1 tonne/h of aqueous phase charged with solvent, which was recycled to the contact zone G50; and
 a flow of 52.6 tonnes/h of condensed hydrocarbon phase which could optionally be stabilised then washed to free it of the solvent it contained (2.5% by weight), before upgrading.

This example shows that using the process of the invention results in performances equivalent to those obtained using the prior art process by dividing the fraction of gas to be treated which has to be contacted with a solution charged with solvent by a factor of more than 5. This means that the size, weight and cost of the contactor, which are major factors for this type of process, are substantially reduced.

EXAMPLE 2

Natural gas was produced on site under the pressure, temperature, flow and composition conditions described for Example 1. In this example, the solvent used was again methanol.

In this example, 65% of the gas produced was mixed in line 102 with a fraction of the aqueous phase charged with solvent from washing the condensates, evacuated via line 118. The mixture was sent to exchanger E101. At the outlet from this exchanger, in line 106, the temperature of the partially condensed gas was 20° C.

Three phases left separating drum B51:
 a flow of 242.40 tonnes/h of gas with a residual water content of 600 ppm mole, which was evacuated via line 109;
 a flow of 1.75 tonnes/h of water containing a small amount of solvent (7% by weight) which was used to wash the condensed hydrocarbon phase from drum B1; and
 4.70 tonnes/h of condensed hydrocarbon phase, which could optionally be recycled (via line 107B) or evacuated to the stabilisation column (via line 107A).

The remaining fraction of the gas produced (45%) was injected into contact zone G100 via line 101. Contactor G100 contained a structured packing. An aqueous solution of cooled solvent, evacuated from drum B1, was sent to the head of the contactor via line 103 and a fraction of the aqueous solution from washing the condensates was sent as a side stream via line 119. At the outlet from the contact step, an aqueous solution which was depleted in solvent left the contactor via line1 105. This solution contained 140 ppm by weight of solvent. The flow rate of the aqueous phase evacuated from the contact zone, about 2 tonnes/h, approximately corresponded to the quantity of water initially contained in the 380 tonnes/h of gas to be treated.

The gas leaving the head of the packing via line 104 became charged with solvent on contact with the aqueous solution. It was mixed with gas from drum B51 and received a solvent makeup of 50 kg/h before being sent to exchangers E22 and E1. This makeup was adjusted to avoid any risk connected with hydrate formation.

After exchanger E1, the temperature was −35° C. Drum B1 separated three phases:
 a flow of 320 tonnes/h of treated gas, containing a residual water content of 5.13 ppm mole. This gas could optionally be used as a coolant for exchangers E22 and E21 before being sent to a distributing system;
 a flow of 1 tonne/h of aqueous phase charged with solvent, part of which was recycled to the contact zone G100 and the other part upstream of exchanger E101; and
 a flow of 55.4 tonnes/h of condensed hydrocarbon phase which was mixed with the flow of condensate from drum B51 before being stabilised. During the stabilisation step, the major portion of the methane and ethane contained in the condensates was eliminated. A flow of 50.60 tonnes/h of stabibsed condensates was mixed in mixer M100 with water containing a small amount of solvent evacuated from drum B51.

After settling in drum B100, two phases were recovered:

washed condensates having a residual solvent content of 700 ppm by weight; and an aqueous phase charged with solvent recycled as described above.

This example shows that carrying out the operations of dehydration, degassing with cooled solvent and washing the condensates can be effected using the process of the invention contacting only 45% of the gas produced. As in Example 1, the size, weight and cost of the contactor, which are major factors in this type of process, are significantly reduced; further, solvent consumption is substantially reduced.

The preceding examples can be repeated with similar success by substituting the generically or specifically described reactants and/or operating conditions of this invention for those used in the preceding examples.

The entire disclosure of all applications, patents and publications, cited above and below, and of corresponding French application 96/11693, are hereby incorporated by reference.

From the foregoing description, one skilled in the art can easily ascertain the essential characteristics ofthis invention, and without departing from the spirit and scope thereof, can make various changes and modifications of the invention to adapt it to various usages and conditions.

We claim:

1. A process for the treatment of a gas containing methane, water and at least one hydrocarbon which is higher than methane, to free the gas at least partially from the water and hydrocarbons which are heavier than methane, characterized in that it comprises the following steps:

a) dividing the gas to be treated into two fractions (1) and (2);

b) cooling said fraction (1), inducing condensation of an aqueous liquid phase and a higher hydrocarbon liquid phase;

c) separating the phases from cooling step (b);

d) bringing said fraction (2) of the gas to be treated from separation step (a) into contact with an aqueous phase comprising a solvent, in a contact zone, the solvent contained in the aqueous phase being extracted by the gas which, at the end of said step (d), is charged with solvent, and the aqueous phase which is at least partially free of solvent being evacuated at the bottom of the contact zone;

e) providing a solvent makeup system;

f) cooling the gas fractions from steps (c) and (d) in the presence of a solvent, either separately or mixed at least in part, to partially condense an aqueous phase comprising solvent and a liquid hydrocarbon phase;

g) separating the treated gas, at least partially free of the water and of the heavier hydrocarbons it contained, the aqueous phases and the liquid hydrocarbon phase from cooling step (f);

h) recycling at least part of the aqueous phase comprising solvent from the end of step (g) to contact step (d).

2. A process according to claim 1, characterized in that the liquid hydrocarbon phase from step (g) is brought into contact with an aqueous phase which originates at least in part from step (c), to eliminate at least part of the solvent it contains.

3. A process according to claim 2, characterized in that the aqueous phase containing solvent from the contact step is recycled to the inlet to the cooling step (b) and/or the contact step (d).

4. A process according to claim 3, characterized in that the liquid hydrocarbon phase from step (f) is washed after a stabilisation step which eliminates the volatile compounds contained therein.

5. A process according to claim 4, further comprising a step for washing the liquid hydrocarbon phase before recovering the solvent.

6. A process according to claim 5, characterized in that the fraction 92) sent to the contact zone with the aqueous phase from step (h) is pre-heated.

7. A process according to claim 3, further comprising a step for washing the liquid hydrocarbon phase before recovering the solvent.

8. A process according to claim 1, characterized in that the liquid hydrocarbon phase from step (f) is washed after a stabilisation step which eliminates the volatile compounds contained therein.

9. A process according to claim 1, characterized in that the solvent is methanol, ethanol, propanol, methylpropylether, ethylpropylether, dipropylether, methyltertiobutylether, dimethoxyrnethane, dimethoxyethane or methoxyethanol.

10. A process according to claim 9, characterized in that the solvent is methanol.

11. A process according to claim 1, characterized in that the recycled aqueous phase sent to step (d) contains 40% to 90% by weight of solvent.

12. A process according to claim 1, characterized in that the temperature of the gas phase at the end of step (g) is in the range $-5°$ C. to $-100°$ C.

13. A process according to claim 1, characterized in that the fraction of gas traversing the contact zone in step (d) represents 10% to 50% of the total gas.

14. A process according to claim 1, characterized in that it further comprising a step for washing the liquid hydrocarbon phase before recovering the solvent.

15. A process according to claim 14, characterized in that said washing step is carried out using mixer settlers.

16. A process according to claim 14, characterized in that said washing step is carried out by contact in a column.

17. A process according to claim 1, characterized in that the fraction (2) sent to the contact zone with the aqueous phase from step (h) is pre-heated.

* * * * *